No. 624,566. Patented May 9, 1899.
S. B. STINE.
OILER FOR CAR WHEELS.
(Application filed Feb. 5, 1898.)

(No Model.)

Witnesses:

Inventor:
Samuel B. Stine

THE NORRIS PETERS CO., PHOTO-LITHO., WASHINGTON, D. C.

UNITED STATES PATENT OFFICE.

SAMUEL B. STINE, OF OSCEOLA MILLS, PENNSYLVANIA.

OILER FOR CAR-WHEELS.

SPECIFICATION forming part of Letters Patent No. 624,566, dated May 9, 1899.

Application filed February 5, 1898. Serial No. 669,200. (No model.)

*To all whom it may concern:*

Be it known that I, SAMUEL B. STINE, a resident of Osceola Mills, in the county of Clearfield and State of Pennsylvania, have invented a new and useful Improvement in Oilers for Car-Wheels; and I do hereby declare the following to be a full, clear, and exact description thereof.

My invention relates to mine-car-wheel oilers, and more particularly to what are generally known as "spring-oilers." These spring-oilers as generally constructed consist of a valve held in position by a spring and a plug adapted to bear against the spring to hold the same in place, the whole being held within a suitable cage.

The object of my invention is to provide a simple form of spring-oiler in which the parts are held within the annular oil-chamber in such a manner that no separate cage is required.

My invention comprises, generally stated, a car-wheel whose hub has an annular chamber for oil surrounding the axle-shell, said chamber having curved bearing faces or grooves with which a spiral spring engages, a valve held in place by said spring, and a plug entering an opening on the rear face of the hub and adapted to retain said spring in place.

To enable others skilled in the art to make and use my invention, I will describe the same more fully, referring to the accompanying drawings, in which—

Figure 1:
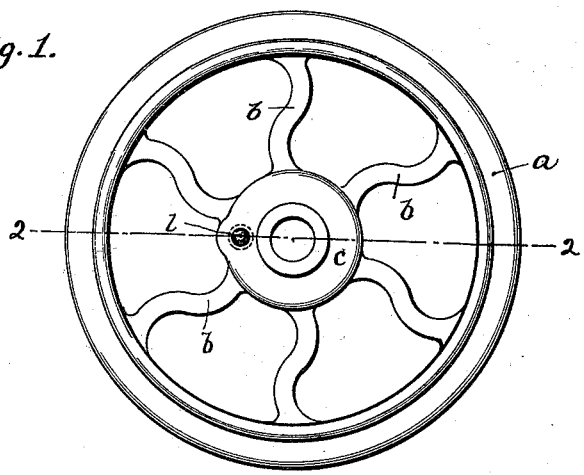
Figure 2:
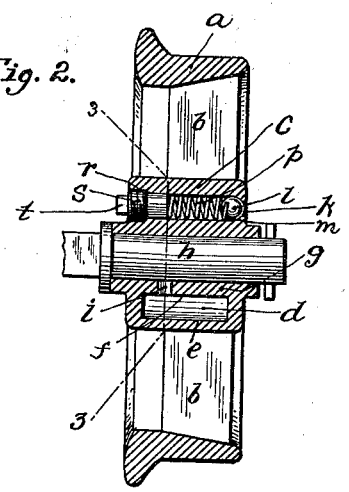
Figure 3:
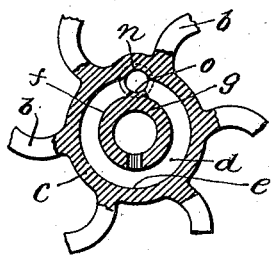

Figure 1 is a front face view of a mine-car wheel with my invention applied thereto. Fig. 2 is a section on line 2 2, Fig. 1. Fig. 3 is a sectional view of the hub on the line 3 3, Fig. 2.

Like letters indicate like parts in each of the figures.

In the drawings the letter $a$ designates an ordinary mine-wheel having the spokes $b$ and the central hub $c$. The hub $c$ has the annular chamber $d$ formed therein, adapted to contain a suitable quantity of oil for lubricating purposes. This chamber $d$ is made up of the outer wall $e$ and the inner wall $f$, said inner wall forming the axle-shell $g$, through which the axle $h$ passes. This axle-shell $g$ has the orifice $i$, through which the oil from the chamber $d$ may pass to the axle and lubricate same.

On the front face of the hub $c$ is the supply-orifice $k$, through which oil is introduced to chamber $d$. A ball-valve $l$ fits into a seat $m$, formed by the curving of the walls $e$ and $f$ at a point surrounding said opening, so that said ball-valve controls the admission of oil to the chamber $d$. This ball-valve is preferably formed of steel, and the more said valve is turned and moved in its seat when oil is being admitted the better it keeps its fit in said seat. Flat valves when moved lose their seat and a leakage is liable to result.

Formed in the outer wall $e$ of the oil-chamber $d$ is the semicircular or curved groove or bearing $n$, while opposite said groove or bearing $n$ in the inner wall $f$ is a like curved groove or bearing $o$. These two grooves $n$ and $o$ form together a bearing for the spiral spring $p$, so that said spring when introduced into said bearing through the opening $r$ at the rear of the hub will be held in position therein. The opening $r$ is threaded and is adapted to receive a threaded plug $s$. This plug $s$ has the square head $t$, by means of which said plug may be grasped and turned by the proper tool for inserting or withdrawing same. The spring $p$ is thus held between the ball-valve $l$ and the plug $s$, and said spring thus acts to retain said valve normally in its seat.

To introduce oil into the chamber $d$, the ball-valve $l$ is pressed back off its seat and the spring $p$ contracts. As soon as sufficient oil has been introduced and the pressure on the valve has been relieved the spring again seats said valve to prevent the escape of the oil.

The bearings for the spring, plug, and valve are all formed in the hub itself and in the walls thereof, so that no separate cage is required to inclose the parts of the oiler. This simplifies the construction in a great measure, as the bearings for the spring can be cast integral with the hub. The bearings for the spring are sufficient to prevent the displacement of the spring when the wheel is subjected to severe jars and jolts.

What I claim as my invention, and desire to secure by Letters Patent, is—

A car-wheel provided with a hub having an annular chamber formed therein and grooves formed on the inner and outer faces of said chamber and connecting with a supply-orifice in the front hub-wall and an opening in the rear hub-wall, a valve controlling the supply-orifice, and a plug closing the opening in the rear hub-wall, and a coiled spring interposed between the valve and plug and fitting in said grooves.

In testimony whereof I, the said SAMUEL B. STINE, have hereunto set my hand.

SAMUEL B. STINE.

Witnesses:
A. S. BOALICH,
GEO. C. RHEA.